(12) United States Patent
Pedersen

(10) Patent No.: US 7,506,206 B2
(45) Date of Patent: Mar. 17, 2009

(54) MECHANISM FOR PROVIDING PROGRAM BREAKPOINTS IN A MICROCONTROLLER WITH FLASH PROGRAM MEMORY

(75) Inventor: Frode Milch Pedersen, Trondheim (NO)

(73) Assignee: Atmel Corporation, San Jose, CA (US)

(*) Notice: Subject to any disclaimer, the term of this patent is extended or adjusted under 35 U.S.C. 154(b) by 606 days.

(21) Appl. No.: 11/147,498

(22) Filed: Jun. 7, 2005

(65) Prior Publication Data

US 2006/0277438 A1 Dec. 7, 2006

(51) Int. Cl.
*G06F 11/00* (2006.01)
(52) U.S. Cl. .................................................. 714/35
(58) Field of Classification Search .............. 714/35, 714/34, 32, 38, 39, 45, 25; 717/124, 127, 717/129
See application file for complete search history.

(56) References Cited

U.S. PATENT DOCUMENTS

| | | | |
|---|---|---|---|
| 4,123,795 A | 10/1978 | Dean, Jr. et al. | |
| 4,435,752 A | 3/1984 | Winkelman | |
| 5,889,981 A | 3/1999 | Betker et al. | |
| 5,931,956 A | 8/1999 | Neff | |
| 5,991,517 A | 11/1999 | Harari et al. | |
| 6,016,555 A | 1/2000 | Deao et al. | |
| 6,075,941 A * | 6/2000 | Itoh et al. | 717/128 |
| 6,094,730 A * | 7/2000 | Lopez et al. | 714/28 |
| 6,145,123 A | 11/2000 | Torrey et al. | |
| 6,373,747 B1 | 4/2002 | Harari et al. | |
| 6,414,876 B1 | 7/2002 | Harari et al. | |
| 6,598,178 B1 | 7/2003 | Yee et al. | |
| 6,708,289 B1 * | 3/2004 | Kudo | 714/28 |
| 6,948,098 B2 * | 9/2005 | Pillay et al. | 714/34 |
| 2002/0100024 A1 | 7/2002 | Hunter et al. | |
| 2002/0188813 A1 | 12/2002 | Cheung et al. | |
| 2003/0154463 A1 | 8/2003 | Betker et al. | |
| 2003/0208745 A1 | 11/2003 | Bystricky et al. | |
| 2004/0030870 A1 | 2/2004 | Buser | |
| 2004/0040013 A1 | 2/2004 | Kalra | |
| 2004/0049712 A1 | 3/2004 | Betker et al. | |
| 2004/0059961 A1 | 3/2004 | Jentsch et al. | |

* cited by examiner

*Primary Examiner*—Nadeem Iqbal
(74) *Attorney, Agent, or Firm*—Schwegman, Lundberg & Woessner, P.A.

(57) ABSTRACT

A microcontroller is disclosed. The microcontroller includes a central processor unit (CPU) and a Flash program memory in communication with the CPU via an instruction bus. The microcontroller includes an on-chip debug (OCD) logic coupled to the CPU. The OCD logic containing logic that detects a zero opcode on an instruction bus between the CPU and the Flash program memory to provide a program breakpoint. This is an advantage over prior art in that any number of such breakpoints can be inserted into the Flash program memory, without requiring the memory to be erased. A system and method in accordance with the present invention provides a vastly improved support for program breakpoints in Flash program memory-based microcontrollers with a minimum increase in on-chip debug logic and complexity.

17 Claims, 1 Drawing Sheet

MECHANISM FOR PROVIDING PROGRAM BREAKPOINTS IN A MICROCONTROLLER WITH FLASH PROGRAM MEMORY

FIELD OF THE INVENTION

The present invention relates generally to on-chip debug functionality with on-chip Flash program memory and more specifically to a mechanism for inserting program breakpoints in Flash program memory without requiring the memory to be erased and reprogrammed.

BACKGROUND OF THE INVENTION

With the development of high-speed microcontrollers with on-chip memory, embedded software development and debugging has become increasingly challenging. The high signal speeds and lack of observability of the embedded system buses dictate the inclusion of on-chip debug (OCD) features to assist in the software development process. The cost of the OCD logic is connected with the level of intrusiveness accepted, i.e., to which extent the CPU can deviate from regular software execution during debugging.

Among the most fundamental debug features are program breakpoints. Program breakpoints involve halting the CPU when the software execution reaches a specific address. Once the CPU is halted, the debug tool can examine the state of system memory and registers in the CPU at this point, by issuing instructions to be executed on the CPU through a debug protocol. Once the examination is completed, the debug tool can return the CPU to normal mode, and execution will continue until the next breakpoint.

The two main approaches for implementing program breakpoints are known as hardware and software breakpoints.

Hardware breakpoints imply detecting when the CPU is about to execute a specific program address. This involves comparing the instruction bus address—or address attached to a fetched instruction, depending on computer architecture—to a specified address in a debug register written by the debug tool. Hardware breakpoints are non-intrusive, having virtually no impact on software execution until the breakpoint triggers. These breakpoints are thus suitable for the few debug situations where complete non-intrusiveness is demanded. However, they are costly, as they require a register and a comparator per breakpoint. For this reason, they are a limited resource in all on-chip debug systems.

Software breakpoints are intrinsically simpler than hardware breakpoints, and imply that the CPU executes a specific opcode as a breakpoint instruction, immediately halting the CPU and returning control to the debug tool. The debug tool can thus replace any opcode in the program memory with a breakpoint instruction, causing the CPU to halt at that address. This also means that the debug tool has to maintain a list of all software breakpoints inserted, and remember the original opcode at that location.

When returning from a software breakpoint, the debug tool has to execute the original opcode on the CPU while still in halt mode, and then return the CPU to normal operation. Software breakpoints are thus more intrusive than hardware breakpoints, as the breakpointed instruction has to be run in halt mode. However, most debug situations allow this intrusiveness, and the method has the huge benefit that an unlimited number of breakpoints can be implemented without additional hardware cost. For this reason, software breakpoints are normally preferred over hardware breakpoints, if supported by the memory technology.

How software breakpoints can be inserted depends on the memory technology of the microcontroller. The program memory can be either volatile or non-volatile. In either case, the program memory can usually be accessed by a debug tool, either directly (e.g. by JTAG commands) or indirectly, by halting the CPU and issuing instructions to access the program memory.

Volatile, i.e. RAM-based, memory is intrinsically read/writeable, while the write access to non-volatile memory depends on the technology. Flash program memory is quickly becoming the most popular non-volatile technology for embedded microcontrollers. Flash program memory can be erased, i.e. all memory cells set to ones, and written, i.e. selected memory cells cleared. The erase and write sequence takes a significant amount of time, typically many seconds if the entire Flash program memory needs to be programmed. Also, the sequence wears out the Flash program memory and can only be conducted a few thousand times before the Flash program memory can fail.

Software breakpoints work well in devices with RAM-based program memory, but have a distinct drawback in Flash program memory-based systems, as they require the memory to be erased and reprogrammed with the modified object code. This takes a considerable amount of time during the debugging, and can eventually wear out the Flash program memory, causing the device to fail permanently. A typical debug session involves adding several breakpoints progressively, as the failing code is narrowed down and identified.

Thus, the Flash program memory has to be reprogrammed several times for each debug session, and multiple debug sessions are required to debug large amounts of embedded code. This problem increases as the size of the embedded Flash program memory increases, both because the number of debug operations increase, and because the programming time increases. For this reason, a large amount of hardware breakpoints are required in Flash program memory microcontrollers, adding to the cost of the device, even if software breakpoints are supported. Therefore in summary, software breakpoints in prior art require the Flash program memory to be erased to insert the breakpoint and hardware breakpoints capable of detecting opcodes require separate debug registers to be implemented, and are more costly.

Accordingly, what is needed is a system and method for overcoming the above-identified problems. The present invention addresses such a need.

SUMMARY OF THE INVENTION

A microcontroller is disclosed. The microcontroller includes a central processor unit (CPU) and a Flash program memory in communication with the CPU via an instruction bus. The microcontroller includes an on-chip debug (OCD) logic coupled to the CPU. The OCD logic containing logic that detects a predetermined opcode on an instruction bus between the CPU and the Flash program memory to provide a program breakpoint.

A system and method in accordance with the present invention provides a vastly improved support for program breakpoints in Flash program memory-based microcontrollers with a minimum increase in on-chip debug logic and complexity.

DETAILED DESCRIPTION

Figure 1:
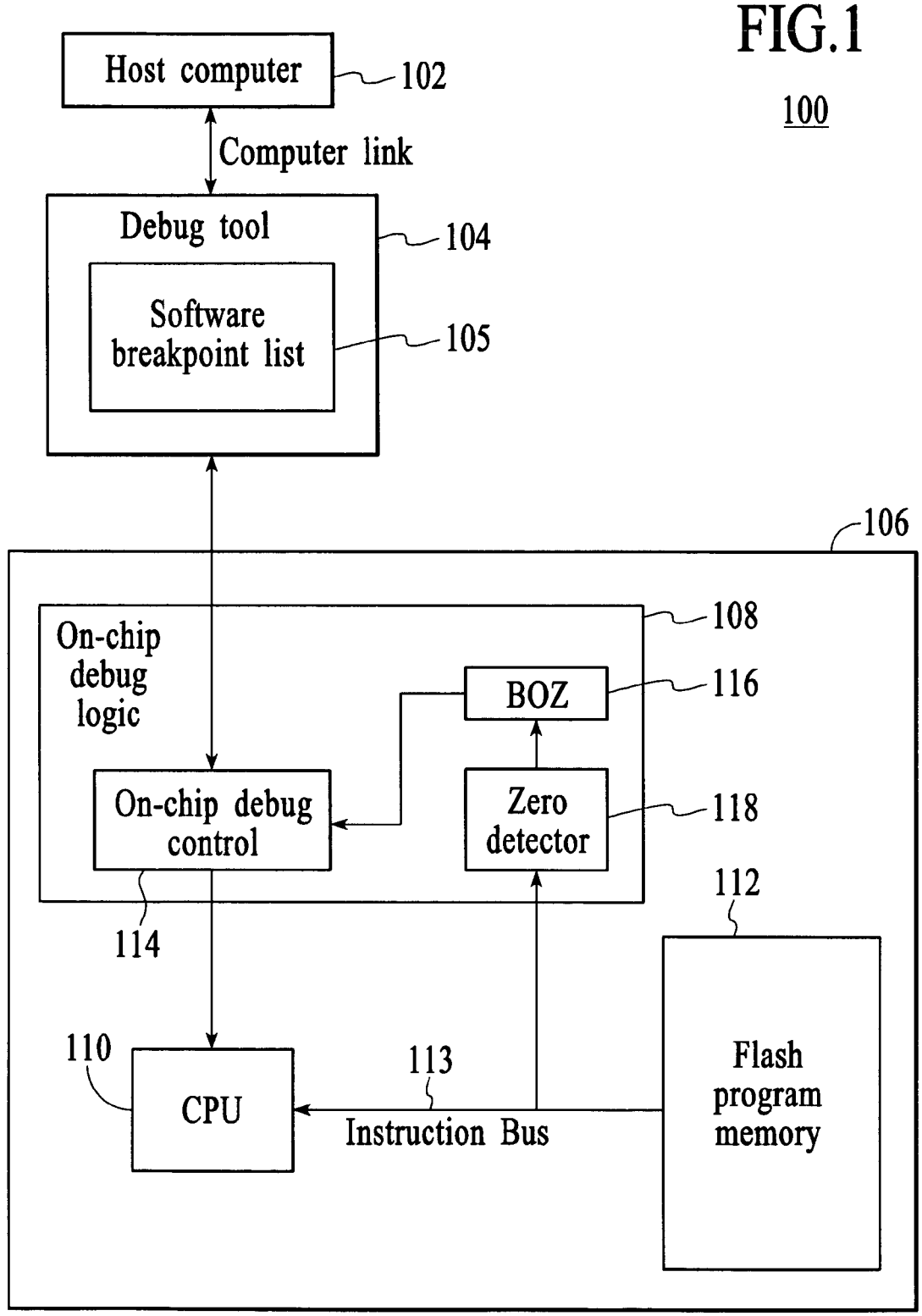
FIG. 1 is illustrates a debug system in accordance with the present invention.

The present invention relates generally to on-chip debug functionality with on-chip Flash program memory and more specifically to a mechanism for inserting software breakpoints in Flash program memory without requiring the memory to be erased and reprogrammed. The following description is presented to enable one of ordinary skill in the art to make and use the invention and is provided in the context of a patent application and its requirements. Various modifications to the preferred embodiments and the generic principles and features described herein will be readily apparent to those skilled in the art. Thus, the present invention is not intended to be limited to the embodiments shown, but is to be accorded the widest scope consistent with the principles and features described herein.

A system and method in accordance with the present invention provides a mechanism for inserting an unlimited number of program breakpoints in Flash program memory without requiring the memory to be erased and reprogrammed.

A mechanism is provided for implementing program breakpoints in microcontrollers with Flash program memory. Unlike software breakpoints, erasing and reprogramming the Flash program memory is not required when inserting these breakpoints. In addition, a system and method in accordance with the present invention is simpler and less costly to implement than hardware breakpoints, and unlike hardware breakpoints, any number of breakpoints can be inserted. The level of intrusiveness is only marginally higher than for software breakpoints. A system and method in accordance with the present invention can be carried out on all CPU architectures that support breakpoints.

A system and method in accordance with the present invention provides a mechanism to implement software breakpoints in Flash program memory-based systems in a manner that reduces the number of times the memory needs to be erased and reprogrammed, thus reducing the debug time, increasing debug flexibility, as well as the lifetime of the device.

A system and method in accordance with the present invention allows the debug tool to implement an algorithm, which allows any number of program breakpoints to be inserted into the embedded Flash program memory of a microcontroller without erasing and reprogramming the Flash program memory.

A system and method in accordance with the present invention provides a vastly improved support for program breakpoints in Flash program memory-based microcontrollers with a minimum increase in on-chip debug logic and complexity.

To describe the features of the present invention in more detail refer now to the following description in conjunction with the accompanying Figure.

FIG. 1 is illustrates a debug system 100 in accordance with the present invention. The debug system 100 includes a host computer 102, a debug tool 104, and a microcontroller device 106. The debug system 100 is programmable by the debug tool 104, either directly, or through instructions on the CPU 110. The debug tool includes a software breakpoint list 105. The microcontroller device 106 includes an on-chip debug (OCD) logic 108, CPU 110 and Flash program memory 112. The on-chip debug logic 108 includes an on-chip debug control 114, a BOZ zero detector flag module 116 and a detector module 118. The examples below assume a 32-bit address bus and 16-bit instruction bus, however one of ordinary skill in the art readily recognizes that a system and method in accordance with the present invention will operate with any bus size and its use would be within the spirit and scope of the present invention.

As mentioned above, software breakpoints are normally implemented by letting the CPU 110 decode a specific opcode as a breakpoint, which halts the CPU 110. This opcode is normally allocated as other opcodes, according to the specific instruction coding scheme used in the CPU 110. Thus, inserting a software breakpoint over an existing opcode could involve both clearing and setting memory bit cells, depending on which opcode is being replaced.

As shown in FIG. 1, a system and method in accordance with the present invention the OCD logic 108 contains a detector module 118, which identifies a predetermined opcode such as the opcode 0x0000 (zero opcode) on the instruction bus 113. The CPU 110 is halted when this opcode occurs, and a zero detector flag 116 is set, signaling to the debug tool 104 that the opcode zero has been detected. The detector module 118 does not require any debug registers, and implements the expression:

$f(inst)=!(inst[n-1]+ \ldots +inst[0])$ wherein f(inst) is a function of the n-bit instruction.

This is intrinsically much simpler than a conventional breakpoint module, which requires a debug register that is as wide as the address bus, and implements the function:

$f(addr, BPA)=addr[31]\textasciicircum BPA[31]\& \ addr[30]\textasciicircum BPA[30\&] \ldots \& addr[0]\textasciicircum BPA[0]$ wherein f(addr, BPA) is a function of the 32 bit program counter address and the user-configured program breakpoint address (BPA).

Additionally, only a single detector module 118 is required, regardless of the number of program breakpoints inserted. The OCD 108 would normally be implemented as a standalone module, although it can be integrated in the CPU 110, depending on the computer architecture.

As for software breakpoints, the debug tool 104 inserts the "opcode zero" program breakpoints by directly overwriting existing opcodes in the Flash program memory 112. However, as these program breakpoints only contains zeroes, they can be inserted only by clearing program memory bit cells from one to zero. Thus any opcode in the Flash program memory 112 can be overwritten without any erase operations. An unlimited number of program breakpoints can then be supported, without having to erase the Flash program memory 112.

The debug tool 104 maintains a list 105 of replaced opcodes. When returning from an opcode zero program breakpoint, the debug tool 104 has to execute the replaced opcode on the CPU 110 before returning the CPU 110 to normal mode. These operations are identical to software breakpoints.

As most instruction coding schemes decode the opcode 0x0000 as a regular instruction, it is impractical to demand that this opcode must be reserved for program breakpoints only. This implies that the CPU 110 will halt due to a "true" program breakpoint, i.e. 0x0000 being intentionally overwritten over an existing opcode, or a "false" program breakpoint, i.e. 0x0000 being part of the original object code. The debug tool software can distinguish between these two cases by checking if the CPU 110 halted at an address contained in the software breakpoint list 105 of active breakpoints. If a match is found, the breakpoint is "true", and handled as a regular software breakpoint, and if a match is not found, the breakpoint is "false" and the opcode 0x0000 is executed in halt mode before the CPU 110 returns to normal operation. Thus, the level of intrusiveness will be marginally higher than for software breakpoints.

During a debug session, it is often desired to add more program breakpoints while clearing some of the breakpoints already issued. This is possible by making the program breakpoint "dormant" by keeping it in the breakpoint list 105, but immediately executing the original instruction and returning to normal operation, making the CPU interruption as short as possible.

When program breakpoints are to be permanently removed, the Flash program memory 112 must be erased and reprogrammed with the original object code. This operation is the same as for software breakpoints, but is only required when the debug session is complete.

Using the above techniques, it is possible to insert any number of program breakpoints during a debug session without erasing and reprogramming the Flash program memory 112 until the debug session is complete.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A microcontroller comprising:
   a central processor unit (CPU);
   a Flash program memory located on a same chip with the CPU and in communication with the CPU via an instruction bus; and
   on-chip debug (OCD) logic coupled to the CPU to detect an opcode on the instruction bus and to provide a program breakpoint.

2. The microcontroller of claim 1 wherein the opcode comprises a zero opcode.

3. The microcontroller of claim 2 wherein the OCD logic comprises:
   a detector for detecting the zero opcode on the instruction bus, wherein the CPU is halted when the zero opcode is detected; and
   a flag module for receiving the zero opcode indication from the detector and for signaling a debug tool that the zero opcode has been detected.

4. The microcontroller of claim 1 wherein the OCD logic comprises a detector module to provide the program breakpoint based on the opcode on the instruction bus that is different from an address bus of the microcontroller.

5. The microcontroller of claim 3 wherein the debug tool is configured to determine whether the opcode detected by the detector is a part of an original object code.

6. A debug system comprising:
   a debug tool; the debug tool including a list of breakpoints; and
   a microcontroller, the microcontroller comprising a central processor unit (CPU); a Flash program memory in communication with the CPU via an instruction bus; and
   on-chip debug (OCD) logic coupled to the CPU, OCD logic containing logic that identifies a zero opcode on the instruction bus to provide a program breakpoint.

7. The debug system of claim 6 wherein the OCD logic comprises:
   a detector for detecting the zero opcode on the instruction bus, wherein the CPU is halted based on the zero opcode; and
   a flag module for receiving the zero opcode indication from the detector and for signaling a debug tool that the zero opcode has been detected.

8. The debug system of claim 6 wherein the OCD logic comprises a detector module to provide the program break point based on a match of the opcode on the instruction bus that has a smaller bus width than a bus width of an address bus of the microcontroller.

9. The debug system of claim 7 wherein the debug tool is configured to determine whether the zero opcode detected by the detector is a part of an original object code and to determine whether the zero opcode detected by the detector is a true breakpoint.

10. A method comprising:
    detecting an opcode on an instruction bus of a microcontroller using an on-chip debug (OCD) logic to provide a program breakpoint, the microcontroller including a central processor unit (CPU) and a Flash program memory in communication with the CPU via the instruction bus.

11. The method of claim 10 wherein the opcode comprises a zero opcode.

12. The method of claim 11 further comprising:
    signaling a debug tool that the zero opcode has been detected; and
    halting the CPU when the zero opcode is detected.

13. The method of claim 10 wherein detecting the opcode is performed by a detector that is integrated in the CPU.

14. The method of claim 12 further comprising:
    distinguishing a difference between the CPU that is halted based on the opcode being a true program breakpoint and the CPU that is halted based on the opcode being a part of an original object code.

15. The microcontroller of claim 1 wherein the Flash memory is configured to be inserted with the program breakpoint without erasing and reprogramming the Flash memory.

16. The debug system of claim 6 wherein the debug tool is configured to insert the program breakpoint into the Flash memory by clearing bit cells in the Flash memory from one to zero.

17. The method of claim 10 further comprising:
    overwriting an existing opcode in the Flash memory with the program breakpoint without an erase operation.

\* \* \* \* \*